US00RE36191E

United States Patent [19]

Solomon

[11] E Patent Number: Re. 36,191

[45] Reissued Date of Patent: Apr. 20, 1999

[54] CONFIGURATION DATA LOOPBACK IN A BUS BRIDGE CIRCUIT

[75] Inventor: Gary Solomon, Hillsboro, Oreg.

[73] Assignee: Intel Corporation, Santa Clara, Calif.

[21] Appl. No.: 08/772,015

[22] Filed: Dec. 19, 1996

Related U.S. Patent Documents

Reissue of:

[64] Patent No.: 5,379,384
Issued: Jan. 3, 1995
Appl. No.: 08/126,111
Filed: Sep. 23, 1993

U.S. Applications:

[63] Continuation of application No. 07/894,108, Jun. 5, 1992, abandoned.

[51] Int. Cl.[6] ..... G06F 13/38

[52] U.S. Cl. ..... 395/308; 395/306

[58] Field of Search ..... 395/306, 308, 395/309, 290, 288, 287

[56] References Cited

U.S. PATENT DOCUMENTS

| | | | |
|---|---|---|---|
| 4,864,496 | 9/1989 | Triolo et el. | 395/306 |
| 4,958,271 | 9/1990 | Yoshida et al. | 395/308 |
| 4,975,838 | 12/1990 | Mizuno et al. | 392/275 |
| 5,029,074 | 7/1991 | Maskas et al. | 395/309 |
| 5,083,260 | 1/1992 | Tsuchiya | 395/325 |

*Primary Examiner*—Glenn A. Auve
*Attorney, Agent, or Firm*—Blakely, Sokoloff, Taylor & Zafman LLP

[57] ABSTRACT

A method and apparatus for reducing cost and complexity of devices in a bus bridge circuit by dividing address and data paths between separate devices to reduce pin count, and by looping back "bridged" configuration data to access configuration registers. The host bridge circuit "bridges" all I/O accesses received over a host bus directly to a peripheral component bus without any decoding. The CDC is both initiator and target on the peripheral component bus for I/O access cycles generated by the host bridge circuit that are targeted for a host bridge configuration register.

40 Claims, 4 Drawing Sheets

CONFIGURATION DATA LOOPBACK IN A BUS BRIDGE CIRCUIT

Matter enclosed in heavy brackets [ ] appears in the original patent but forms no part of this reissue specification; matter printed in italics indicates the additions made by reissue.

This is a continuation of U.S. application Ser. No. 07/894,108 filed Jun. 5, 1992, now abandoned.

BACKGROUND OF THE INVENTION

1. Field of the Invention

This invention relates to the field of computer system architecture. More particularly, this invention relates to accessing configuration registers in a bus bridge circuit.

2. Background

In a computer system, peripheral components, such as disk drive controllers, network controllers, and graphics controllers, may be coupled to peripheral component buses separate from a host, or CPU bus. There are several reasons a system might employ peripheral component buses. For example, it may be desirable to isolate slower speed devices from higher bandwidth buses and peripherals. Also, an intelligent peripheral component may have a local peripheral component bus. Moreover, the system may have more peripheral components than can be reliably placed on the host bus, due to electrical loading effects.

In such a system, a host bridge circuit enables communication between the peripheral component bus and the host bus. The host bridge circuit enables an access request that initiates on the host bus to have a destination on the peripheral component bus, and enables an access request that initiates on the peripheral component bus to have a destination on the host bus. The host bridge circuit can also enable access to a shared resource from both buses. Typically, the host bridge circuit contains a set of configuration registers that define parameters for processing access cycles between the buses, and for controlling the shared resource. System I/O software performs reads and writes to the configuration registers in order to define the parameters.

However, integrated circuit subsystems in the host bridge circuit require enough signal lines to communicate address, data, and control information for both the host bus and the peripheral component bus. The resulting large packages sizes of the integrated circuit devices greatly increases the system cost. Moreover, the host bridge devices must process memory accesses to the shared resource as well as I/O access of configuration registers, which increases the complexity of logic implemented in the host bridge devices.

As will be described, the present method and apparatus reduces cost and complexity of devices for a bus bridge circuit by dividing address and data paths between separate devices to reduce pin count, and by looping back "bridged" configuration data to access configuration registers.

SUMMARY OF THE INVENTION

A method and apparatus is disclosed for reducing cost and complexity of devices in a bus bridge circuit by dividing address and data paths between separate devices to reduce pin count, and by looping back "bridged" configuration data to access configuration registers. The bridge circuit is comprised primarily of two integrated circuit devices: a cache DRAM controller (CDC), and a data path unit (DPU).

The host bridge circuit "bridges" all I/O accesses received over a host bus directly to a peripheral component bus without the need for any address decoding. The CDC receives addresses for I/O accesses over an address portion of the host bus, and the DPU receives corresponding data for the I/O accesses over a data portion of the host bus. The CDC also receives control signals over the host bus indicating an I/O access cycle.

To bridge I/O access cycles, the host bridge circuit translates the host bus I/O access cycles into I/O access cycles for the peripheral component bus. The CDC generates an I/O access cycle on the peripheral component bus by assuming the role of bus initiator on the peripheral component bus, generating control signals indicating an I/O access cycle, and transferring the address received over the address portion of the host bus to the peripheral component bus. The CDC also generates control signals, which cause the DPU to transfer data received over the data portion of the host bus to the peripheral component bus.

To loop back configuration data, the host bridge circuit "bridges" the host bus I/O access cycles targeted for the configuration registers of the CDC. The CDC bus initiator on the peripheral component bus initiates and drives the I/O access cycle targeted for the configuration registers. However, the CDC also monitors the peripheral component bus as a bus target. The CDC decodes the control signals on the peripheral component bus indicating an I/O access, and decodes the address transmitted on the peripheral component bus. If the address corresponds to a configuration register, the CDC receives the data as a target on the peripheral component bus. Thus, for I/O access cycles generated by the host bridge circuit and targeted for a configuration register, the CDC is both initiator and target for the peripheral component bus I/O access cycle.

DETAILED DESCRIPTION OF THE INVENTION

A method and apparatus is disclosed for reducing cost and complexity of devices in a bus bridge circuit by dividing address and data paths between separate devices to reduce pin count, and by looping back "bridged" configuration data to access configuration registers. In the following description, for purposes of explanation, specific circuit devices, circuit architectures and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
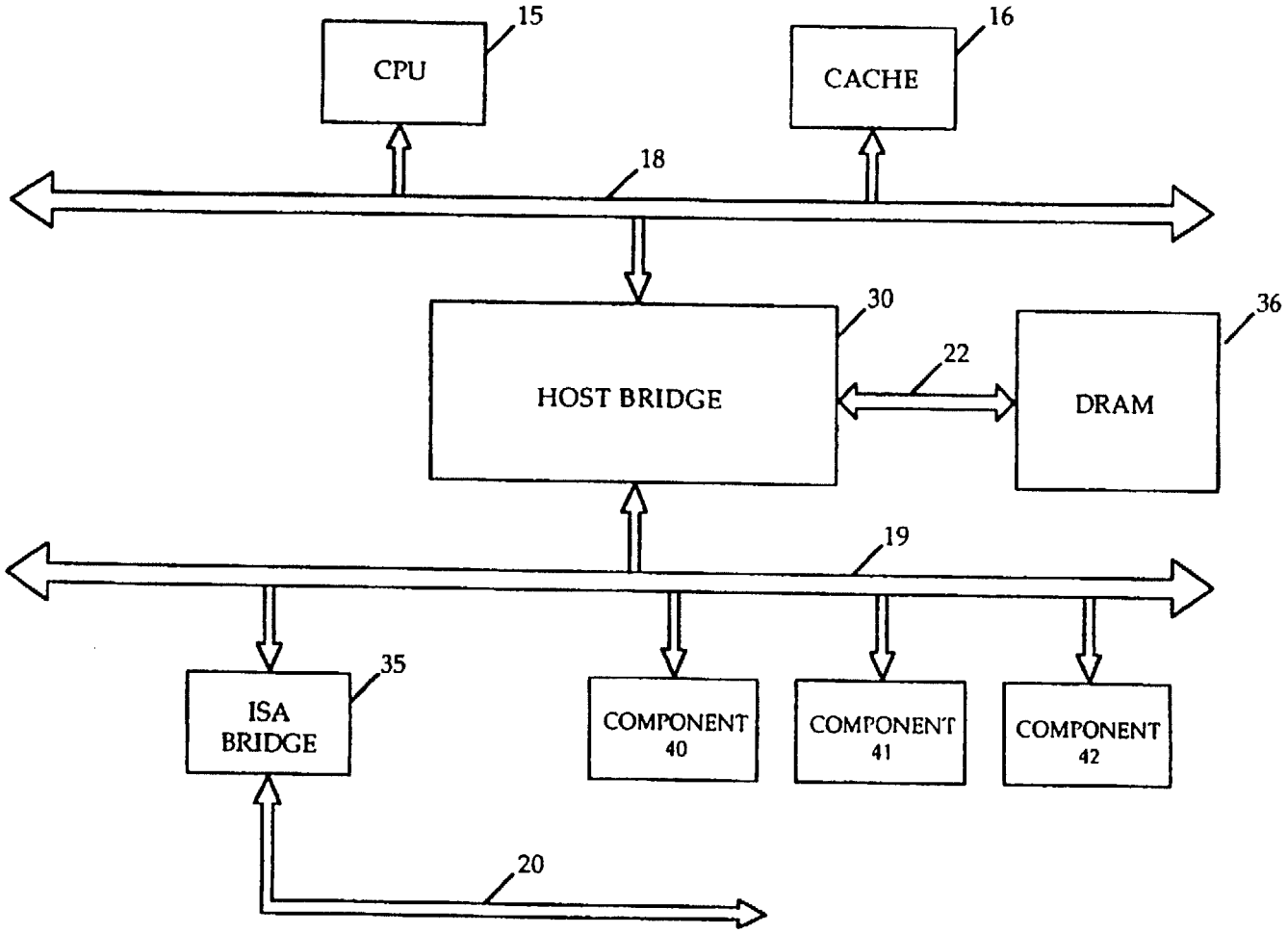
FIG. 1 illustrates an example computer system employing the teachings of the present invention, including a hierarchical arrangement of buses comprising a host bus, a host bridge circuit, a peripheral component bus, and an ISA bus.

Referring now to FIG. 1, an example computer system employing the teachings of the present invention is illustrated. A CPU 15 and a cache subsystem 16 are shown coupled for communication over a host bus 18. In the current embodiment, the host bus 18 provides a 32 bit memory address space and a 16 bit I/O address space.

A host bridge circuit 30 enables communication between bus agents coupled to the host bus 18, and bus agents coupled to a peripheral component bus 19. An ISA bridge circuit 35 enables communication between bus agents coupled to the peripheral component bus 19, and bus agents coupled to an ISA bus 20.

Peripheral components 40–42 are bus agents coupled for communication over the peripheral component bus 19. In addition, the host bridge circuit 30 and the ISA bridge circuit 35 are coupled as bus agents for communication over the peripheral component bus 19. The host bridge circuit 30 and the ISA bridge circuit 35 have the capability to be initiators and targets for access cycles over the peripheral component bus 19.

In the current embodiment, the peripheral component bus 19 comprises 32 bit memory address and 32 bit I/O address spaces, with the addresses and data multiplexed over the same bus lines. For further discussion of a peripheral component bus consistent with the teachings of the present invention, refer to related U.S application Ser. No. 07/876,577, filed on Apr. 30, 1992, entitled A Signalling Protocol for a Peripheral Component Interconnect, and incorporated fully herein by reference.

Bridge circuits, such as the host bridge circuit 30 and the ISA bridge circuit 35, are each coupled to a primary bus and a secondary bus. A bridge circuit enables an access request that initiates on the primary bus to have a destination on the secondary bus, and enables an access request that initiates on the secondary bus to have a destination on the primary bus.

For example, the host bridge circuit 30 receives access requests over the host bus 18, and initiates peripheral component bus 19 access requests to communicate with the peripheral components 40–42, and bus agents on the ISA bus 20 through the ISA bridge circuit 35. Also, the host bridge circuit 30 receives access requests over the peripheral component bus 19, and initiates host bus 18 access requests to communicate over the host bus 18.

Similarly, the ISA bridge circuit 35 receives access requests over the ISA bus 20, and initiates peripheral component bus 19 access requests to communicate with the peripheral components 40–42, and the host bridge circuit 30. Also, the ISA bridge circuit 35 receives access requests over the peripheral component bus 19, and initiates ISA bus 20 access requests to communicate over the ISA bus 20.

In the current embodiment, the host bridge circuit 30 enables access to a shared DRAM subsystem 36. The host bridge circuit 30 receives access requests for the DRAM subsystem 36 over the host bus 18, and the peripheral component bus 19. Bus initiators coupled to the peripheral component bus 19 access the DRAM subsystem 36 by initiating an access cycle on the peripheral component bus 19, and by broadcasting an address within a range of addresses allocated to the DRAM subsystem 36. The peripheral components 40–42, and the ISA bridge circuit 35 can each assume the role of bus initiator and access the DRAM subsystem 36 over the peripheral component bus 19, through the host bridge circuit 30.

Figure 2:
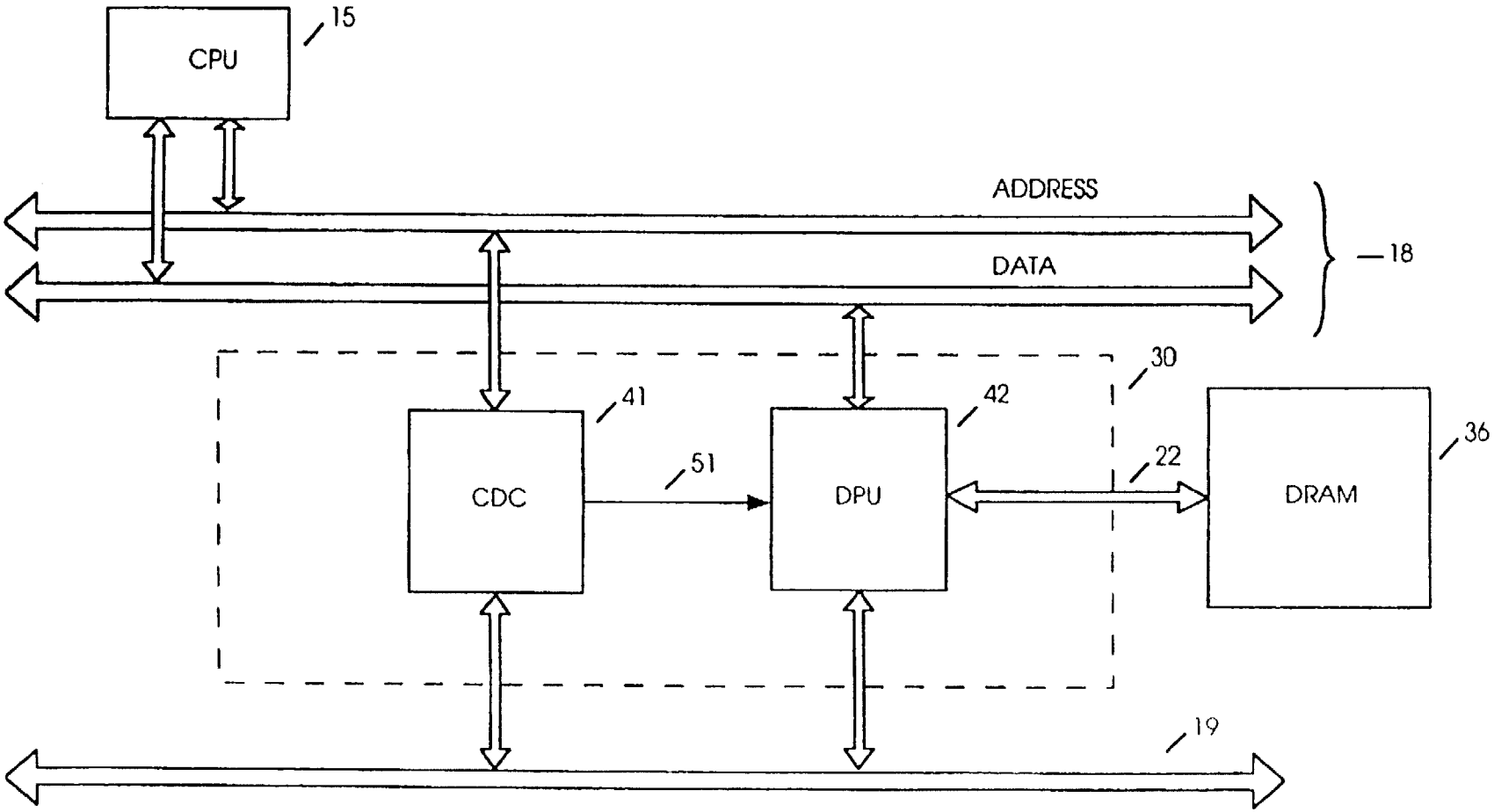
FIG. 2 is a more detailed illustration of the host bridge circuit, which is comprised primarily of two integrated circuit devices: a cache DRAM controller (CDC), and a data path unit (DPU).

FIG. 2 is a more detailed illustration of the host bridge circuit 30, which is comprised primarily of two integrated circuit devices: a cache DRAM controller (CDC) 41, and a data path unit (DPU) 42. To reduce the number of pins for the CDC 41 and the DPU 42, the address and data paths of the host bus 18 are divided. The CDC 41 is coupled to transfer addresses for memory and I/O accesses over the address portion of the host bus 18, and the DPU 42 is coupled to transfer data for memory and I/O access over the data portion of the host bus 18. The CDC 41 is also coupled to transfer control signals over a control portion (not shown) of the host bus 18.

Moreover, the CDC 41 is a full function initiator and target on she peripheral component bus 19. The CDC 41 is coupled to transfer addresses, data and control signals for memory and I/O accesses over the peripheral component bus 19. The DPU 42 is coupled to transfer data for memory and I/O accesses over the peripheral component bus 19.

When the host bridge circuit 30 is the initiator for a bus cycle over the peripheral component bus 19, the DPU 42 drives out the data during the data phase of the bus cycle. The DPU 42 also receives data during the data phase of bus cycles over the peripheral component bus 19 when the host bridge circuit 30 is the target for the bus cycle. However, the CDC 41 receives data during the data phase of bus cycles over the peripheral component bus 19 for internal configuration of the CDC 41.

The CDC 41 is a memory controller for the DRAM subsystem 36, and a cache controller for the cache subsystem 16. The DPU 42 switches data flow through the host bridge circuit 30 according to control signals 51 received from the CDC 41.

The CDC 41 contains a set of configuration registers which define parameters for host bridge circuit 30 functions. For example, in the current embodiment, the CDC 41 contains registers defining a memory address mapping for the DRAM subsystems 36 and the cache subsystem 16, as well as control parameter information for the DRAM and cache controller of the CDC 41. The CDC 41 also contains registers for controlling the bandwidth of burst accesses of the DRAM subsystem 36 over the peripheral component bus 19.

The CDC 41 and the DPU 42 enable dual port access to the DRAM subsystem 36 from the host bus 18 and the peripheral component bus 19. To access the DRAM subsystem 36 over the host bus 18, the CPU 15, or another bus initiator coupled to the host bus 18, broadcasts a memory address over the address portion of the host bus 18 within the range of memory address mapped to the DRAM subsystem 36. The CDC 41 receives the memory addresses over the address portion of the host bus 18. If the memory addresses are allocated to the DRAM subsystem 36, the CDC 41 issues control signals 51, which cause the DPU 42 to transfer data between the data portion of the host bus 18 and the DRAM subsystem 36.

If the control signals on the control bus of the host bus 18 indicated a read memory cycle, then the control signals 51 cause the DPU 42 to read data from the DRAM subsystem 36 over the memory bus 22, and transfer the data over the data portion of the host bus 18. On the other hand, if the control signals on the control bus of the host bus 18 indicated a write memory cycle, then the control signals 51 cause the DPU 42 to transfer data from the data portion of the host bus 18 to the DRAM subsystem 36.

Similarly, bus initiators coupled to the peripheral component bus 19 access the DRAM subsystem 36 by initiating a memory access cycle on the peripheral component bus 19, and by broadcasting an address within a range of addresses mapped to the DRAM subsystem 36. The CDC 41 receives the memory addresses over a multiplexed address/data portion (AD) of the peripheral component bus 19. The AD portion of the peripheral component bus 19 has an address phase and a data phase. If the memory address broadcast in the address phase is allocated to the DRAM subsystem 36, the CDC 41 issues control signals 51, which cause the DPU 42 to transfer data between the DRAM subsystem 36 and the AD portion of the peripheral component bus 19 during the data phases.

During a memory read cycle on the peripheral component bus 19, the control signals 51 cause the DPU 42 to read data from the DRAM subsystem 36 over the memory bus 22, and transfer the data over the peripheral component bus 19 during the data phase. During a write memory cycle on the peripheral component bus 19, the control signals 51 cause the DPU 42 to transfer data from the AD portion of the peripheral component bus 19 during the data phase to the DRAM subsystem 36.

To reduce the complexity of logic implemented in the CDC 41 and the DPU 42, the host bridge circuit 30 "bridges" all I/O accesses received over the host bus 18 directly to the peripheral component bus 19 without any address decoding. The host bridge circuit 30 translates the host bus 18 I/O accesses into I/O accesses for the peripheral component bus 19.

To translate I/O accesses, the CDC 41 receives the addresses for I/O accesses over the address portion of the host bus 18, and the DPU 42 receives the corresponding data for the I/O accesses over the data portion of the host bus 18. The CDC 41 also receives control signals over the host bus 18 indicating an I/O access cycle.

The host bridge circuit 30 generates corresponding I/O access cycles over the peripheral component bus 19. To generate an I/O access cycle on the peripheral component bus 19, the CDC 41 assumes the role of bus initiator on the peripheral component bus 19, generates control signals indicating an I/O access cycle on the peripheral component bus 19, and transfers the addresses for I/O accesses received over the address portion of the host bus 18 to the multiplexed AD portion of the peripheral component bus 19 during the address phase. Also, the CDC 41 generates control signals 51, which causes the DPU 42 to transfer data corresponding to the I/O accesses received over the data portion of the host bus 18 to the multiplexed AD portion of the peripheral component bus 19 during the data phase.

In the current embodiment, system I/O software executed by the CPU 15 controls the host bridge 30 functions by programming the configuration registers of the CDC 41. In the current embodiment, the configuration registers of the CDC 41 are mapped to the I/O address space of the host bus 18. For example, the system I/O software allocates an address mapping for the DRAM subsystem 36 by programming the appropriate configuration registers in the CDC 41 using I/O write cycles over the host bus 18.

To loop back configuration data, the host bridge circuit 30 "bridges" the host bus 18 I/O access cycles targeted for the configuration registers of the CDC 41 to the peripheral component bus 19 as corresponding I/O access cycles. The CDC 41 bus initiator on the peripheral component bus 19 initiates and drives the I/O access cycle targeted for the configuration registers. However, the CDC 41 also monitors the peripheral component bus 19 as a bus target. The CDC 41 decodes the control signals on the peripheral component bus 19 indicating an I/O access or configuration space access, and decodes the address transmitted on the AD portion of the peripheral component bus 19 during the address phase. If the address corresponds to a configuration register of the CDC 41, then the CDC 41 receives the data as a target on the peripheral component bus 19. Thus, for I/O access cycles generated by the host bridge circuit 30 and targeted for a configuration register of the CDC 41, the CDC 41 is both initiator and target for the peripheral component bus 19 I/O access cycle.

Figure 3:
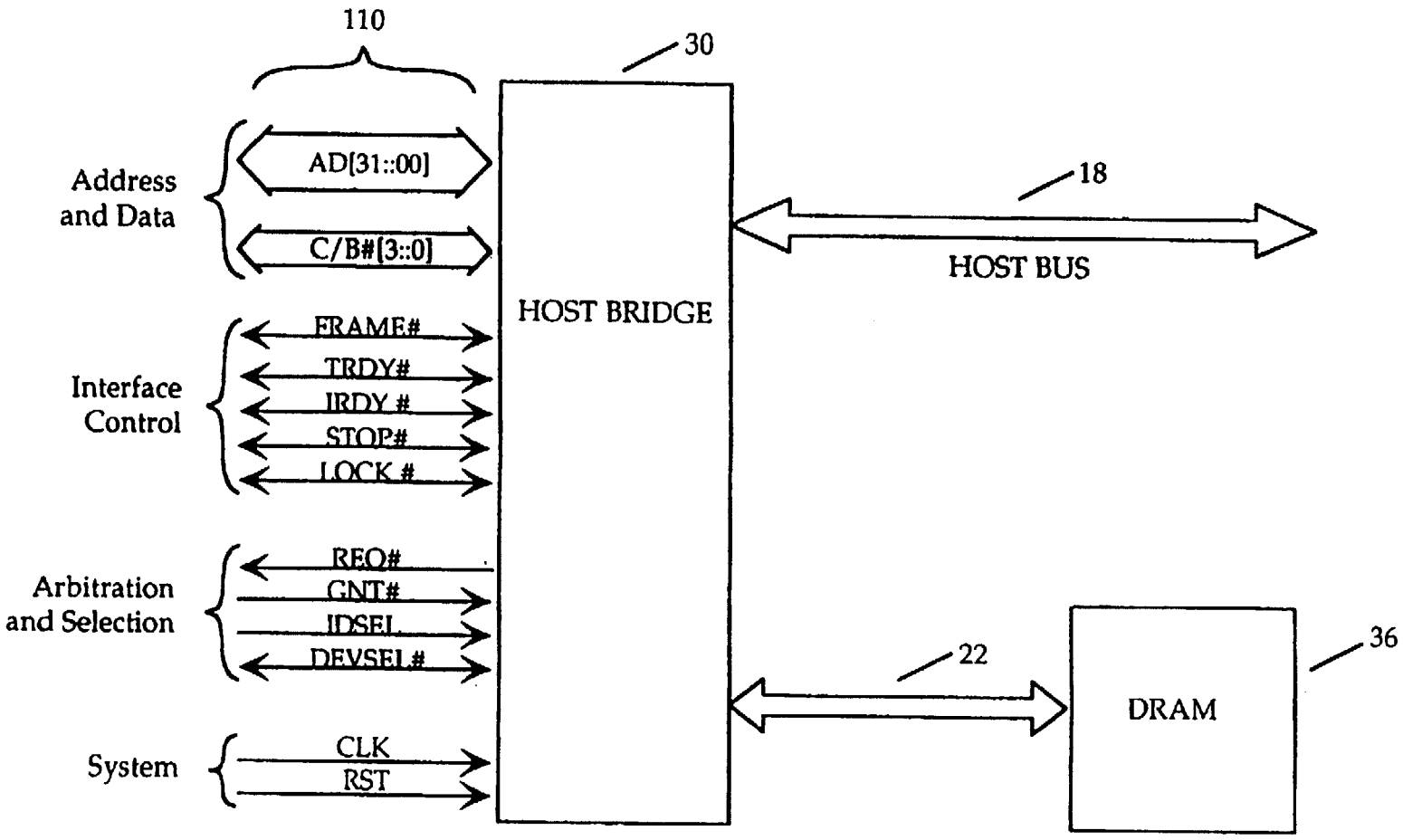
FIG. 3 shows the coupling of the host bridge circuit to the host bus and the memory bus, and shows the bus signals implemented on the peripheral component bus.

FIG. 3 shows the coupling of the host bridge circuit 30 to the host bus 18 and the memory bus 22, and shows the bus signals implemented on the peripheral component bus 19. Bus signals 110 comprise the peripheral component bus 19. Addresses and data are multiplexed over the 32 AD bus lines. The C/BE bus lines indicate bus command and byte enable information. Basic control information is transferred over a FRAME#, a TRDY#, an IRDY#, a STOP#, and a LOCK# bus signal. Bus arbitration and selection functions are provided by a REQ#, a GNT#, an IDSEL# and a DEVSEL# bus signal. Synchronization is provided by a CLK bus signal. For a detailed description of these bus signals refer to related U.S. application Ser. No. 07/876,577, filed on Apr. 30, 1992, entitled A Signalling Protocol for a Peripheral Component Interconnect.

Figure 4:
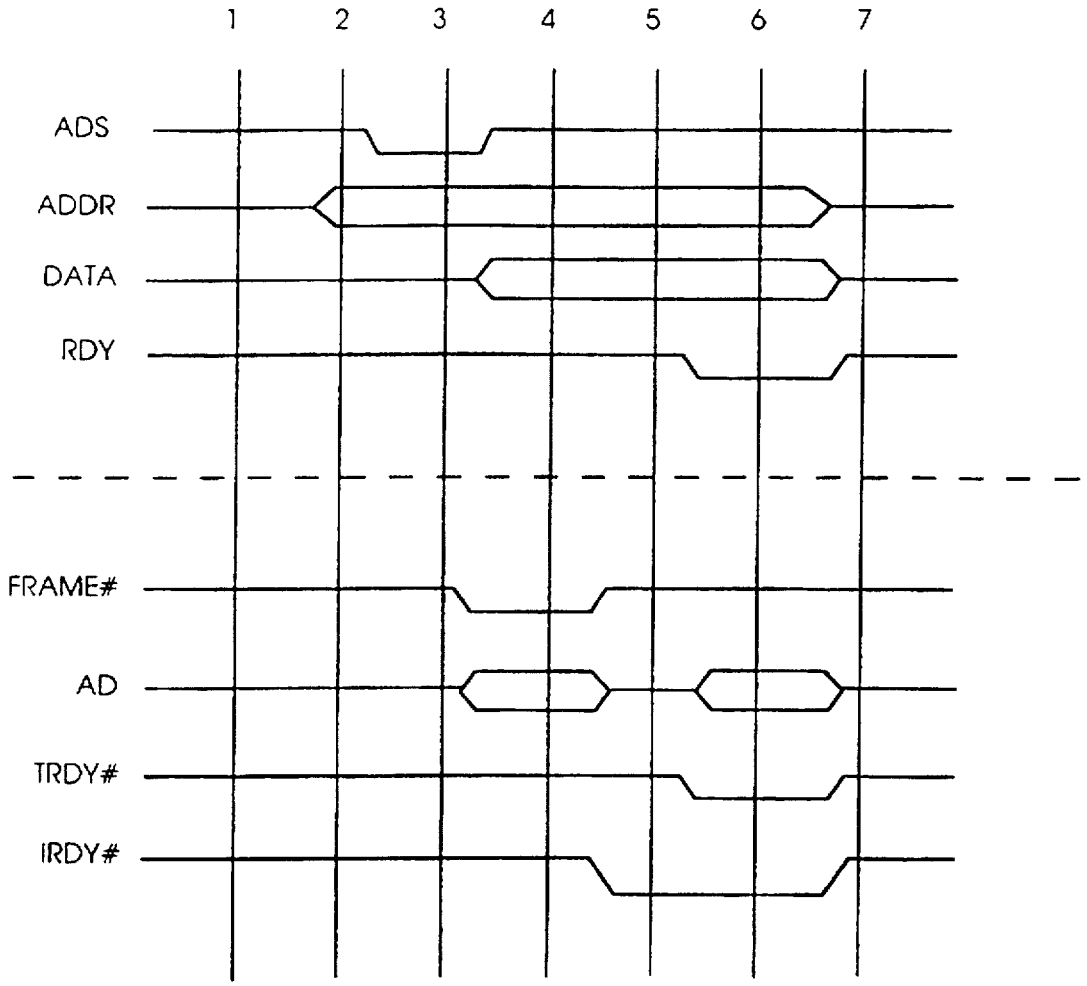
FIG. 4 illustrates the timing of an I/O write cycle targeted for a configuration register of the CDC. The I/O write cycle originates on the host bus and is looped back over the peripheral component bus to the CDC.

FIG. 4 illustrates the timing of an I/O write cycle targeted for a configuration register of the CDC 41. The I/O write cycle originates on the host bus 18 and is looped back over the peripheral component bus 19 to the CDC 41. In the current embodiment, I/O access cycles targeted for the configuration registers of the CDC 41 are generated by system I/O software executed by the CPU 15. The host bridge circuit 30 translates the I/O write cycle on the host bus 18 into an I/O access or configuration space access cycle on the peripheral component bus 19, and the host bridge circuit 30 loops back the cycle on the peripheral component bus 19 into the appropriate configuration register of the CDC 41.

The I/O write cycle on the host bus 18 begins between times 1 and 2 when the CPU 15 transmits an address (ADDR) corresponding to an internal configuration register of the CDC 41, over the address portion of the host bus 18. Between times 2 and 3, the CPU 15 asserts an address strobe signal (ADS) indicating that a valid address is being transmitted over the address portion of the host bus 18. The CPU 15 also asserts control signals (not shown) over the host bus 18 indicating an I/O write cycle.

Thereafter, between times 3 and 4, the CPU 15 transmits the data (DATA) for the I/O write cycle over the data portion of the host bus 18. The CDC 41 translates the I/O write cycle on the host bus 18 into an I/O write cycle on the peripheral component bus 19 by first asserting the FRAME# signal to indicate the start of an access cycle on the peripheral component bus 19. The CDC 41 signals an I/O write cycle over the C/BE# signal lines of the peripheral component bus 19. Also between times 3 and 4, the CDC 41 transfers the address received over the address portion of the host bus 18 to the AD portion of the peripheral component bus 19 during the address phase.

The CDC 41 asserts the IRDY#signal between times 4 and 5, and the TRDY#signal between times 5 and 6 to signal both "initiator ready to send" and "target ready to receive" during the data phase portion of the peripheral component bus 19. Also between times 5 and 6, the CDC 41 issues control signals 51, which causes the DPU 42 to transfer the data received over the data portion of the host bus 18 to the AD portion of the peripheral component bus 19 during the data phase. The CDC 41 then transfers the data from the AD portion of the peripheral component bus 19 to the appropriate configuration register. Also between times 5 and 6, the CDC 41 asserts an RDY signal on the control portion of the host bus 18 to signal the CPU 15 that data for the I/O write cycle has been accepted.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are accordingly to be regarded as an illustrative, rather than in a restrictive sense.

What is claimed is:

1. A method for writing a configuration register in a bus bridge circuit, comprising the steps of:

sensing an access cycle on a first bus, and receiving an address over the first bus;

bridging the access cycle sensed on the first bus to an access cycle on a second bus by initiating the access cycle on the second bus and transmitting the address received over the first bus over the second bus without decoding the address received over the first bus;

sensing the access cycle on the second bus, and decoding the address present on the second bus;

receiving a data value over the first bus, the data value corresponding to the access cycle sensed on the first bus;

bridging the data value to the access cycle on the second bus by transmitting the data value received over the first bus over the second bus;

if the address decoded on the second bus selects the configuration register in the bus bridge circuit, then receiving the data value present on the second bus and storing the data value in the configuration register.

2. The method of claim 1, wherein the step of receiving an address over the first bus comprises the step of receiving the address over an address portion of the first bus.

3. The method of claim 2, wherein the step of transmitting the address received over the first bus over the second bus comprises the step of transmitting the address received over the first bus over the second bus during an address phase of the access cycle on the second bus.

4. The method of claim 3, wherein the step of decoding the address present on the second bus comprises the step of decoding the address present on the second bus during the address phase of the access cycle on the second bus.

5. The method of claim 4, wherein the step of bridging the data value to the access cycle on the second bus by transmitting the data value received over the first bus over the second bus comprises the step of transmitting the data value received over the first bus over the second bus during a data phase of the access cycle on the second bus.

6. The method of claim 5, wherein the step of receiving the data value present on the second bus comprises the step of receiving the data value present on the second bus during the data phase of the access cycle on the second bus.

7. A circuit for writing a configuration register in a bus bridge circuit, comprising:

circuit for sensing an access cycle on a first bus, and receiving an address over the first bus;

circuit for bridging the access cycle sensed on the first bus to an access cycle on a second bus by initiating the access cycle on the second bus and transmitting the address received over the first bus over the second bus without decoding the address received over the first bus;

circuit for sensing the access cycle on the second bus, and decoding the address present on the second bus;

circuit for receiving a data value over the first bus, the data value corresponding to the access cycle sensed on the first bus;

circuit for bridging the data value to the access cycle on the second bus by transmitting the data value received over the first bus over the second bus;

circuit for receiving the data value present on the second bus and storing the data value in the configuration register if the address decoded on the second bus selects the configuration register in the bus bridge circuit.

8. The circuit of claim 7, wherein the circuit for receiving an address over the first bus comprises circuit for receiving the address over an address portion of the first bus.

9. The circuit of claim 8, wherein the circuit for transmitting the address received over the first bus over the second bus comprises circuit for transmitting the address received over the first bus over the second during an address phase of the access cycle on the second bus.

10. The circuit of claim 9, wherein the circuit for decoding the address present on the second bus comprises circuit for decoding the address present on the second bus during the address phase of the access cycle on the second bus.

11. The circuit of claim 10, wherein the circuit for bridging the data value to the access cycle on the second bus by transmitting the data value received over the first bus over the second bus comprises circuit for transmitting the data value received over the first bus over the second bus during a data phase of the access cycle on the second bus.

12. The circuit of claim 11, wherein the circuit for receiving the data value present on the second bus comprises circuit for receiving the data value present on the second bus during the data phase of the access cycle on the second bus.

13. A bus bridge circuit, comprising:

control circuit containing at least one configuration register, the control circuit sensing an access cycle on a first bus, and receiving an address over the first bus, the control circuit bridging the access cycle sensed on the first bus to an access cycle on a second bus by initiating the access cycle on the second bus and transmitting the address received over the first bus over the second bus without decoding the address received over the first bus, the control circuit also sensing the access cycle on the second bus, and decoding the address present on the second bus, the control circuit receiving a data value present on the second bus and storing the data value in the configuration register if the address on the second bus selects the configuration register in the bus bridge circuit;

data path circuit receiving the data value over the first bus, the data value corresponding to the access cycle sensed on the first bus, the data path circuit bridging the data value to the access cycle on the second bus by transmitting the data value received over the first bus over the second bus.

14. The bus bridge circuit of claim 13, wherein the control circuit transmits the address received over the first bus over the second bus during an address phase of the access cycle on the second bus.

15. The bus bridge circuit of claim 14, wherein the control circuit decodes the address present on the second bus during the address phase of the access cycle on the second bus.

16. The bus bridge circuit of claim 15, wherein the data path circuit transmits the data value received over the first bus over the second bus during a data phase of the access cycle on the second bus.

17. The bus bridge circuit of claim 16, wherein the control circuit receives the data value present on the second bus during the data phase of the access cycle on the second bus.

18. A computer system, comprising:

central processing means coupled for communication over a first bus;

memory subsystem comprising dynamic random access memory;

a plurality of peripheral components coupled for communication over a second bus;

bus bridge circuit coupled to the memory subsystem and coupled for communication over the first bus and the second bus, the bus bridge circuit enabling access to the memory subsystem from the first bus and the second bus, the bridge circuit containing at least one configuration register for controlling the memory subsystem, the bus bridge circuit enabling a write access to the configuration register by translating an access cycle received over the first bus and targeted for the configuration register into an access cycle on the second bus targeted for the configuration register and writing the configuration register according to the access cycle on the second bus.

19. The computer system of claim 18, wherein the bus bridge circuit comprises:

circuit for sensing the access cycle on the first bus, and receiving an address over the first bus;

circuit for bridging the access cycle sensed on the first bus to an access cycle on a second bus by initiating the access cycle on the second bus and transmitting the address received over the first bus over the second bus without decoding the address received over the first bus;

circuit for sensing the access cycle on the second bus, and decoding the address present on the second bus;

circuit for receiving a data value over the first bus, the data value corresponding to the access cycle sensed on the first bus;

circuit for bridging the data value to the access cycle on the second bus by transmitting the data value received over the first bus over the second bus;

circuit for receiving the data value present on the second bus and storing the data value in the configuration register if the address decoded on the second bus selects the configuration register.

20. The computer system of claim 19, wherein the circuit for receiving an address over the first bus comprises circuit for receiving the address over an address portion of the first bus.

21. The computer system of claim 20, wherein the circuit for transmitting the address received over the first bus over the second bus comprises circuit for transmitting the address received over the first bus over the second bus during an address phase of the access cycle on the second bus.

22. The computer system of claim 21, wherein the circuit for decoding the address present on the second bus comprises circuit for decoding the address present on the second bus during the address phase of the access cycle on the second bus.

23. The computer system of claim 22, wherein the circuit for bridging the data value to the access cycle on the second bus by transmitting the data value received over the first bus over the second bus comprises circuit for transmitting the data value received over the first bus over the second bus during a data phase of the access cycle on the second bus.

24. The computer system of claim 23, wherein the circuit for receiving the data value present on the second bus comprises circuit for receiving the data value present on the second bus during the data phase of the access cycle on the second bus.

*25. A bus bridge for coupling between a first bus and a second bus to allow communication between the first bus and the second bus, comprising:*

*a configuration register; and*

*a circuit coupled to the configuration register that generates an access cycle transmitted on the second bus and targeted for the configuration register in response to an access cycle received from the first bus, wherein the circuit receives the access cycle from the second bus such that the bus bridge is both initiator and target of the access cycle on the second bus.*

*26. A bus bridge for coupling between a first bus and a second bus to allow communication between the first bus and the second bus, comprising:*

*first means for generating an access cycle transmitted on the second bus and targeted for the bus bridge in response to receiving an access cycle from the first bus; and*

*second means coupled to the second bus for receiving the access cycle transmitted on the second bus such that the bus bridge is both initiator and target of the access cycle transmitted on the second bus.*

*27. A bus bridge for coupling between a first bus and a second bus to allow communication between the first bus and the second bus, comprising:*

*a configuration register;*

*first means for generating an access cycle transmitted on the second bus and targeted for the configuration register in response to receiving an access cycle from the first bus; and*

*second means coupled to the second bus for receiving the access cycle transmitted on the second bus such that the bus bridge is both initiator and target of the access cycle transmitted on the second bus.*

*28. A bus bridge for coupling between a first bus and a second bus to allow communication between the first bus and the second bus, comprising:*

*a configuration register; and*

*a first circuit for coupling to address lines of the first bus and to the second bus, the first circuit generating an access cycle transmitted on the second bus and targeted for the configuration register in response to receiving an access cycle from the first bus, the first circuit receiving the second access cycle such that the bus bridge is both initiator and target of the second access cycle.*

*29. A method for accessing a configuration register of a bus bridge that couples a first bus to a second bus to enable communication between the first bus and the second bus, the method comprising:*

*the bus bridge receiving a first access cycle from the first bus;*

*the bus bridge generating and transmitting a second access cycle targeted for the configuration register on the second bus in response to receiving the first access cycle; and*

*the bus bridge receiving the second access cycle such that the bus bridge is both initiator and target of the second access cycle.*

*30. A bus bridge for coupling between a first bus and a second bus to allow communication between the first bus and the second bus, comprising:*

*a configuration register; and*

*a circuit coupled to the configuration register that translates a first access cycle received from the first bus into a second access cycle transmitted on the second bus and targeted for the configuration register, wherein the circuit receives the second access cycle such that the bus bridge is both initiator and target of the second access cycle.*

*31. The bus bridge circuit of claim 30, wherein the configuration register is only accessible from the second bus.*

*32. A bus bridge for coupling between a first bus and a second bus to allow communication between the first bus and the second bus, comprising:*

*first means for translating a first access cycle received from the first bus and targeted for the bus bridge into a second access cycle transmitted on the second bus and targeted for the bus bridge; and*

*second means coupled to the second bus for receiving the second access cycle such that the bus bridge is both initiator and target of the second access cycle.*

*33. A bus bridge for coupling between a first bus and a second bus to allow communication between the first bus and the second bus, comprising:*

*a configuration register;*

*first means for translating a first access cycle received from the first bus into a second access cycle transmitted on the second bus and targeted for the configuration register; and*

*second means coupled to the configuration register and the second bus for receiving the second access cycle such that the bus bridge is both initiator and target of the second access cycle.*

*34. The bus bridge of claim 33, wherein the configuration register is only accessible from the second bus.*

*35. The bus bridge of claim 33, wherein the second means is further for accessing the configuration register in response to the second access cycle.*

*36. A bus bridge for coupling between a first bus and a second bus to allow communication between the first bus and the second bus, comprising:*

*a first circuit for coupling to address lines of the first bus and to the second bus, the first circuit translating a first access cycle received from the first bus and targeted for the bus bridge into a second access cycle transmitted on the second bus and targeted for the bus bridge; and*

*a second circuit coupled to the first circuit for coupling to data lines of the first bus and to the second bus, the second circuit passing data associated with the first access cycle to the second bus in response to a control signal received from the first circuit, wherein the first circuit receives the data such that the bus bridge is both initiator and target of the second access cycle.*

*37. A bus bridge for coupling between a first bus and a second bus to allow communication between the first bus and the second bus, comprising:*

*a configuration register; and*

*a first circuit coupled to the configuration register and for coupling to address lines of the first bus and to the second bus, the first circuit translating a first access cycle received from the first bus into a second access cycle transmitted on the second bus and targeted for the configuration register, the first circuit receiving the second access cycle such that the bus bridge is both initiator and target of the second access cycle.*

*38. The bus bridge of claim 37, further comprising:*

*a second circuit coupled to the first circuit for coupling to data lines of the first bus and to the second bus, the second circuit passing data associated with the first access cycle to the second bus in response to a control signal received from the first circuit, wherein the first circuit receiving the second access cycle and the data such that the bus bridge is both initiator and target of the second access cycle.*

*39. The bus bridge of claim 37, wherein the configuration register is only accessible from the second bus.*

*40. A method for accessing a configuration register of a bus bridge that couples a first bus to a second bus to enable communication between the first bus and the second bus, the method comprising:*

*the bus bridge receiving a first access cycle targeted for the configuration register from the first bus;*

*the bus bridge translating the first access cycle into a second access cycle targeted for the configuration register and transmitted on the second bus; and*

*the bus bridge receiving the second access cycle such that the bus bridge is both initiator and target of the second access cycle.*

* * * * *